United States Patent [19]
Schob et al.

[11] Patent Number: 4,615,592
[45] Date of Patent: Oct. 7, 1986

[54] COUPLING FOR THE DRIVE OF A MECHANICAL STAGE

[75] Inventors: Wolfgang Schob, Oberkochen; Horst Fischer, Aalen, both of Fed. Rep. of Germany

[73] Assignee: Carl-Zeiss-Stiftung, Oberkochen, Fed. Rep. of Germany

[21] Appl. No.: 680,166

[22] Filed: Dec. 10, 1984

[30] Foreign Application Priority Data

Dec. 16, 1983 [DE] Fed. Rep. of Germany ....... 3345570

[51] Int. Cl.⁴ ............................................. G02B 21/26
[52] U.S. Cl. ..................................... 350/531; 74/479
[58] Field of Search ................. 350/531; 74/206, 209, 74/213

[56] References Cited
U.S. PATENT DOCUMENTS 3,815,430 6/1974 Strobel et al. ..................... 74/206
4,402,576 9/1983 Stahl et al. ....................... 350/531

*Primary Examiner*—John K. Corbin
*Assistant Examiner*—Vincent J. Lemmo
*Attorney, Agent, or Firm*—Hopgood, Calimafde, Kalil, Blaustein & Judlowe

[57] ABSTRACT

The invention contemplates selectively engageable/disengageable coupling mechanism within the respective drive trains which impart two-component displacement to a mechanical stage such as a microscope stage. For each component of drive, a pressure roller is selectively interposable between a drive-side friction wheel and a driven-side friction wheel which are engaged only when the pressure roller is in loaded contact with both of these wheels.

3 Claims, 3 Drawing Figures

COUPLING FOR THE DRIVE OF A MECHANICAL STAGE

BACKGROUND OF THE INVENTION

Conventional mechanical stages for microscopes have manually actuable drive mechanism mounted below the table, with a coaxial arrangement of the drive means for the two directions of displacement. The transmission of the rotary actuation of the drive knobs is translated into table displacement via pinions which mesh with racks on individually displaceable table parts.

When scanning large-area objects, the user of such tables frequently desires to bring the table rapidly into an approximate desired position without time-consuming rotation of the drive mechanism, which operates with a very high reduction ratio.

A simple direct shifting of the table by hand is, however, not readily possible since the drive mechanism is characterized by friction which is necessary to assure stability of the table; this friction, in the context of the transmission-reduction ratio, makes a rather large expenditure of force necessary, whereby the racks or pinions could be damaged.

For rapid displacement of the table, it is already known to disconnect the drive mechanism from the table by means of an additional handle. Such devices are described, for instance, in German Pat. Nos. 3,025,974 and 3,037,710 and German Offenlegungsschrift application Nos. OS-3,027,461 and OS-3,037,741. For this purpose, friction-wheel gearing is interposed between the table and the drive mechanism, and for disconnection, the drive mechanism is either moved axially or the entire drive-mechanism housing is moved radially, so that both the drive-side and the driven-side friction wheels become disengaged.

The known solutions are, however, unsatisfactory, since, on the one hand, the drives should be relatively secure with respect to the table while, on the other hand, the engagement and disengagement process should take place easily so as to avoid accidential displacement of the table. Both of these requirements can be satisfied from a design standpoint only with difficulty or by relatively expensive measures.

BRIEF STATEMENT OF THE INVENTION

The object of the present invention is to provide a selectively engageable/disengageable coupling for the drive of a mechanical stage, wherein there is no displacement of drive mechanism in order to engage or disengage coupling.

The invention achieves this object by selectively interposing a pressure roller in the drive train for each of two components of stage drive. For each of these components of drive, there is a drive-side friction wheel and a driven-side friction wheel which are engaged only when the pressure roller is in loaded contact with both these wheels. A single actuating device establishes the engaged or disengaged condition of both component drive trains.

This solution has the advantage over the prior art that it is of simple and uncomplicated construction since, for an uncoupling, a pressure roller, or two rollers seated on a common shaft, one for each component of table displacement, need only be retracted from engagement with friction wheels which are mounted on fixedly spaced axes. The pressure roller is illustratively carried by a pivoted lever which is readily displaceable via a knob-operated eccentric.

DETAILED DESCRIPTION

The invention will be described in detail for a preferred embodiment, in conjunction with the accompanying drawings, in which.

Figure 2:
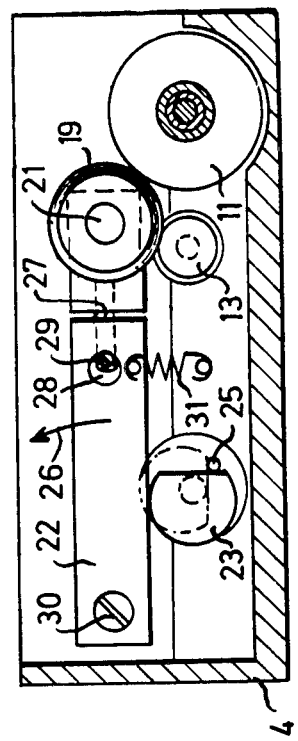
FIG. 2 is a horizontal section, along the line II—II of FIG. 1.

The drawings show the invention in application to the table 1 of a mechanical stage (e.g., a microscope stage) which is displaceable in two orthogonally related component directions. The table 1 carries a rack 2 which meshes with a pinion 8 on a driven shaft 7; shaft 7 is rotatable in a bearing 6 and also mounts a driven-side friction wheel 12. Drive for shaft 7 originates with a rotary knob 18 of coaxial drive mechanism, rotatably mounted by a drive-mechanism housing 4. Knob 18 is on a tubular shaft 17 which carries a drive-side friction wheel 16, and a pressure roller 20, selectively engageable to both friction wheels 12, 16 is the means of coupling knob 18 to shaft 7.

The bearing 6 for driven shaft 7 is secured to a carriage 3 which is guided by coacting guide means 105 on the fixed part or base 106 of the mechanical stage, so that bearing 6 is displaceable in the plane of the drawing. Bearing 6 also carries a tubular shaft 10 having a pinion 9 which meshes with a rack 5 that is bolted at 107 to the fixed stage part. Shaft 10 is driven by a rotary knob 15 via second friction-wheel mechanism consisting of a drive-side friction wheel 13 fastened to the shaft 14 of knob 15, a pressure roller 19, and a driven-side friction wheel 11 on shaft 10.

The drive-mechanism housing 4, in which the coaxial drive-mechanism 13-18 is mounted, is also fastened to carriage 3. Accordingly, upon rotation of knob 15, carriage 3 and the drive mechanism housing 4 move along the rack 5, and table 1 is carried along in this component direction.

The pressure rollers 19 and 20 couple the friction wheels 11/13 and 12/16 to each other via a resiliently loaded engagement. Both rollers 19 and 20 are mounted on a shaft 21 which is held with play, via a rod 27, to a lever 22 which is pivotable about a support pin 30. Rod 27 is guided in a bore in lever 22 and has limited freedom of longitudinal and rotary movement with respect to lever 22, the limits being determined by a small-diameter transverse securing pin 29 in rod 27, with pin 29 trapped in a large-diameter transverse hole 28 in lever 22. A spring 31 resiliently biases lever 22 in the direction of pressure-roller engagement. The play which is thus afforded for mounting rollers 19 and 20 provides assurance that both rollers 19 and 20 will always engage with constant resiliently loaded force against the two pairs of friction wheels 11/13 and 12/16.

To disengage the described drive mechanism, a cam 23 which can be actuated by another rotary knob 24 is provided in the drive-mechanism housing. Upon rotating cam 23 against a stop 25, lever 22 is swung, in the direction indicated by an arrow 26, and the pressure rollers 19 and 20 are lifted away from the corresponding friction wheels.

Figure 3:
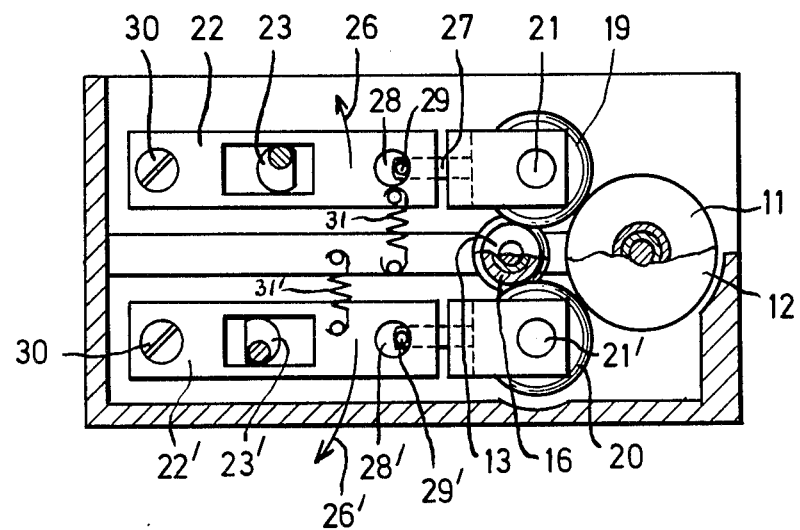
FIG. 3 is a view similar to FIG. 2 to show a modification.

In the described embodiment, the two pressure rollers 19 and 20 are actuated jointly by a single rotary knob 24, and in this way table 1 is disengaged from the drive mechanism with respect to both component directions of displacement. It is, of course, just as possible to mount each of the two rollers 19 and 20 for individually pivoted displacement, and to provide each of them with its own rotary knob, should rapid displacement in only one coordinate direction be desired. Such is the arrangement of FIG. 3, wherein lever 22 is shown to have a forked end via which roller 19 is supported in a first plane of engageability to friction wheels 11–13, and wherein a second lever 22' is shown to have a forked end via which roller 20 is supported in a second plane of engageability to friction wheels 12–16. Separately actuable rotary cams 23–23' enable selective operation of these levers, in opposite swing directions 26–26'.

Figure 1:
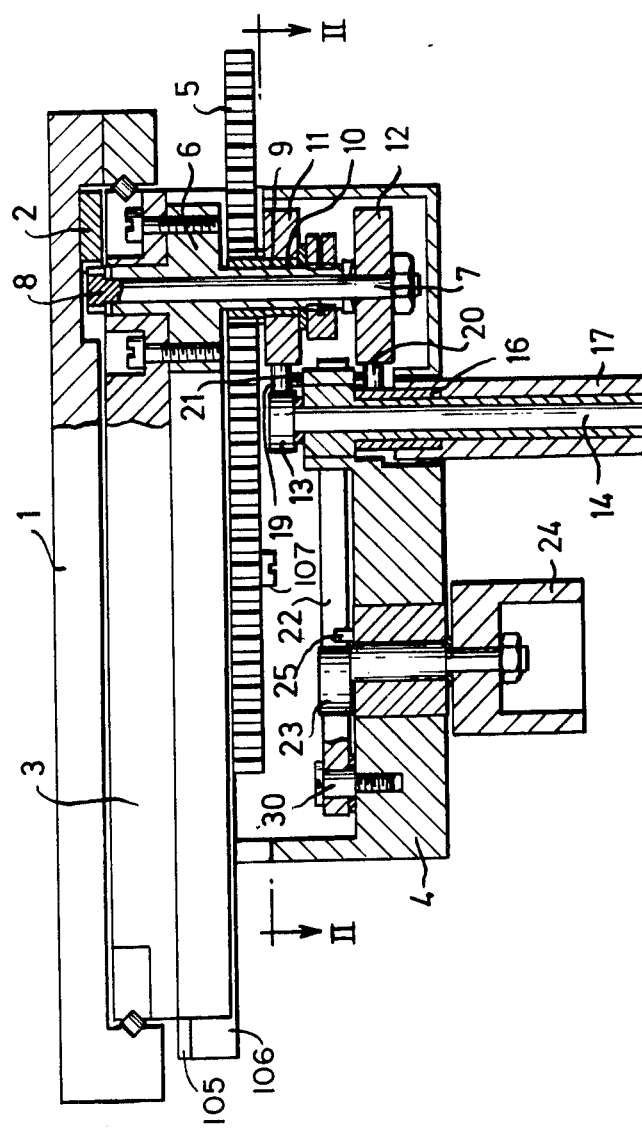
FIG. 1 is a vertical section through a mechanical stage wherein the displacement drive mechanism incorporates coupling means of the invention.

It is furthermore possible, in the case of FIGS. 1 and 2, to mount knob 24 coaxially to the two rotary knobs 15 and 18 of the drive mechanism.

What is claimed is:

1. A mechanical stage comprising a fixed base, a carriage and guide means coacting between said base and carriage for establishing a first rectilineal component of displaceability, a stage table and guide means coating between said carriage and stage table on an alignment orthogonal to said first component for establishing a second component of displaceability, first drive means including (1) a manually operable drive-side friction wheel and (2) a driven-side friction wheel and first pinion, said friction wheels being in spaced relation to each other and mounted on fixed axes of rotation on said carriage, said first drive means further including a rack carried by said base in the direction of said first component and in mesh with said first pinion, second drive means including a manually operable drive-side friction wheel and a driven-side friction wheel and second pinion in spaced relation to each other and mounted on fixed axes of rotation on said carriage, said second drive means further including a rack carried by said table in the direction of said second component and in mesh with said second pinion, and engagement/disengagement means including a pressure roller associated with each of said drive means, both pressure rollers being independently rotatable at spaced locations on a common shaft, and manually operable means engaged to said shaft between said rollers and with at least some tilting freedom for said shaft for engaging/disengaging displacement of both rollers into and out of concurrent contact with the two friction wheels of the respective drive means.

2. The stage of claim 1, in which said first and second drive-side friction wheels are mounted on a first common axis of rotation on said carriage, and said first and second driven-side friction wheels are mounted on a second column fixed axis of rotation on said carriage.

3. The stage of claim 1, in which said manually operable means comprises a swing lever pivoted to said carriage and loosely connected at its free end to said shaft.

* * * * *